US010240269B2

(12) United States Patent
Schultz et al.

(10) Patent No.: US 10,240,269 B2
(45) Date of Patent: Mar. 26, 2019

(54) ELECTRET WEBS WITH CHARGE-ENHANCING ADDITIVES

(71) Applicant: 3M INNOVATIVE PROPERTIES COMPANY, St. Paul, MN (US)

(72) Inventors: Nathan E. Schultz, Lakeland, MN (US); Fuming B. Li, Woodbury, MN (US); John M. Sebastian, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 265 days.

(21) Appl. No.: 15/320,176

(22) PCT Filed: Jun. 9, 2015

(86) PCT No.: PCT/US2015/034891
§ 371 (c)(1),
(2) Date: Dec. 19, 2016

(87) PCT Pub. No.: WO2015/199972
PCT Pub. Date: Dec. 30, 2015

(65) Prior Publication Data
US 2017/0121875 A1 May 4, 2017

Related U.S. Application Data

(60) Provisional application No. 62/015,637, filed on Jun. 23, 2014.

(51) Int. Cl.
*D04H 1/56* (2006.01)
*D06M 10/02* (2006.01)
*B01D 46/00* (2006.01)
*D06M 10/00* (2006.01)
*D04H 1/4291* (2012.01)
*B01D 39/16* (2006.01)
*D06B 1/02* (2006.01)
*D06B 5/08* (2006.01)

(52) U.S. Cl.
CPC .......... *D04H 1/56* (2013.01); *B01D 39/1623* (2013.01); *B01D 46/0032* (2013.01); *D04H 1/4291* (2013.01); *D06B 1/02* (2013.01); *D06B 5/08* (2013.01); *D06M 10/00* (2013.01); *D06M 10/025* (2013.01); *B01D 2239/0435* (2013.01); *B01D 2239/0618* (2013.01); *B01D 2239/0622* (2013.01); *B01D 2239/0627* (2013.01); *D06B 2700/14* (2013.01)

(58) Field of Classification Search
CPC combination set(s) only.
See application file for complete search history.

(56) References Cited

U.S. PATENT DOCUMENTS

| | | | |
|---|---|---|---|
| 3,971,373 | A | 7/1976 | Braun |
| 4,100,324 | A | 7/1978 | Anderson |
| 4,118,531 | A | 10/1978 | Hauser |
| 4,215,682 | A | 8/1980 | Kubik |
| 4,264,750 | A | 4/1981 | Anand |
| RE30,782 | E | 10/1981 | van Turnhout |
| 4,340,563 | A | 7/1982 | Appel |
| 4,375,718 | A | 3/1983 | Wadsworth |
| RE31,285 | E | 6/1983 | van Turnhout |
| 4,429,001 | A | 1/1984 | Kolpin |
| 4,508,781 | A | 4/1985 | Yagi |
| 4,557,945 | A | 12/1985 | Yagi |
| 4,588,537 | A | 5/1986 | Klaase |
| RE32,171 | E | 6/1986 | van Turnhout |
| 4,592,815 | A | 6/1986 | Nakao |
| 4,652,282 | A | 3/1987 | Ohmori |
| 4,789,504 | A | 12/1988 | Ohmori |
| 4,874,659 | A | 10/1989 | Ando |
| 5,057,710 | A | 10/1991 | Nishiura |
| 5,401,446 | A | 3/1995 | Tsai |
| 5,496,507 | A | 3/1996 | Angadjivand |
| 5,556,618 | A | 9/1996 | Ando |
| 5,871,845 | A | 2/1999 | Dahringer |
| 5,908,598 | A | 6/1999 | Rousseau |
| 5,914,186 | A | 6/1999 | Yau |
| 5,919,847 | A | 7/1999 | Rousseau |
| 5,968,635 | A | 10/1999 | Rousseau |
| 5,976,208 | A | 11/1999 | Rousseau |

(Continued)

FOREIGN PATENT DOCUMENTS

| | | |
|---|---|---|
| CA | 2280353 | 2/2000 |
| EP | 0623941 | 11/1994 |

(Continued)

OTHER PUBLICATIONS

Wente, "Superfine Thermoplastic Fibers", Industrial and Engineering Chemistry, May 25, 1954, vol. 48, No. 8, pp. 1342-1346.
Wente, "Manufacture of Super Fine Organic Fibres", May 25, 1954, 19 pages.
Davies, "The Separation of Airborne Dust and Particles", Institution of Mechanical Engineers, London, Proceedings (B), 1952, No. I-12, pp. 185-198.
Waker, "Application of Cavity Theory to the Discharge of Electrostatic Dust Filters by x-Rays*", Applied Radiation and Isotopes, 1988, vol. 39, No. 7, pp. 677-684.

(Continued)

Primary Examiner — Duane Smith
Assistant Examiner — Sonji Turner
(74) Attorney, Agent, or Firm — Jeffrey M. Olofson

(57) ABSTRACT

Electret webs include a thermoplastic resin and a charge-enhancing additive. The charge-enhancing additive is a fused aromatic thiourea, a fused aromatic urea compound, or a combination thereof. The change-enhancing additive may also include a hindered amine light stabilizer compound. The electret webs may be a non-woven fibrous web or a film. The electret webs are suitable for use as filter media.

22 Claims, No Drawings

(56) References Cited

U.S. PATENT DOCUMENTS

| | | |
|---|---|---|
| 6,213,122 B1 | 4/2001 | Rousseau |
| 6,214,094 B1 | 4/2001 | Rousseau |
| 6,238,466 B1 | 5/2001 | Rousseau |
| 6,268,495 B1 | 7/2001 | Rousseau |
| 6,365,088 B1 | 4/2002 | Knight |
| 6,375,886 B1 | 4/2002 | Angadjivand |
| 6,397,458 B1 | 6/2002 | Jones |
| 6,398,847 B1 | 6/2002 | Jones |
| 6,406,657 B1 | 6/2002 | Eitzman |
| 6,409,806 B1 | 6/2002 | Jones |
| 6,419,871 B1 | 7/2002 | Ogale |
| 6,432,175 B1 | 8/2002 | Jones |
| 6,454,986 B1 | 9/2002 | Eitzman |
| 6,524,488 B1 | 2/2003 | Insley |
| 6,562,112 B2 | 5/2003 | Jones |
| 6,607,624 B2 | 8/2003 | Berrigan |
| 6,660,210 B2 | 12/2003 | Jones |
| 6,743,464 B1 | 6/2004 | Insley |
| 6,808,551 B2 | 10/2004 | Jones |
| 6,824,718 B2 | 11/2004 | Eitzman |
| 6,916,752 B2 | 7/2005 | Berrigan |
| 7,244,291 B2 | 7/2007 | Spartz |
| 7,244,292 B2 | 7/2007 | Kirk |
| 7,390,351 B2 | 6/2008 | Leir |
| 7,569,318 B2 | 8/2009 | Michel |
| 7,611,812 B2 | 11/2009 | Michel |
| 7,765,698 B2 | 8/2010 | Sebastian |
| 8,162,153 B2 | 4/2012 | Fox |
| 8,613,795 B2 * | 12/2013 | Li .............................. D01F 1/10 264/423 |
| 2002/0174869 A1 | 11/2002 | Gahan |
| 2003/0134515 A1 | 7/2003 | David |
| 2008/0038976 A1 | 2/2008 | Berrigan |
| 2011/0137082 A1 * | 6/2011 | Li .......................... C07C 211/54 564/434 |

FOREIGN PATENT DOCUMENTS

| | | |
|---|---|---|
| EP | 0447166 | 6/1996 |
| JP | 55132615 | * 10/1980 |
| JP | 6-182128 | 7/1994 |
| JP | 6-254319 | 9/1994 |
| JP | 8-284063 | 10/1996 |
| JP | 2002-212439 | 7/2002 |
| JP | 2002-309099 | 10/2002 |
| JP | 4078591 | 4/2008 |
| WO | WO 1993-14510 | 7/1993 |
| WO | WO 2000-78430 | 12/2000 |
| WO | WO 2001-07144 | 2/2001 |
| WO | WO 2001-26778 | 4/2001 |
| WO | WO 2009-76064 | 6/2009 |
| WO | WO 2009-148744 | 12/2009 |
| WO | WO 2009-148747 | 12/2009 |
| WO | WO 2010-114820 | 10/2010 |

OTHER PUBLICATIONS

International Search Report for PCT International Application No. PCT/US2015/034891 dated Sep. 30, 2015, 4 pages.

* cited by examiner

ELECTRET WEBS WITH CHARGE-ENHANCING ADDITIVES

FIELD OF THE DISCLOSURE

This disclosure relates to electret webs, including non-woven fibrous webs such as non-woven thermoplastic microfiber webs, containing charge-enhancing additives and uses thereof.

BACKGROUND

An electret is a dielectric material that exhibits a quasi-permanent electrical charge. Electrets are useful in a variety of devices including, e.g. cling films, air filters, filtering facepieces, and respirators, and as electrostatic elements in electro-acoustic devices such as microphones, headphones, and electrostatic recorders.

The performance of microfibrous webs used for aerosol filtration can be improved by imparting an electrical charge to the fibers, forming an electret material. In particular, electrets are effective in enhancing particle capture in aerosol filters. A number of methods are known for forming electret materials in microfibrous webs. Such methods include, for example, bombarding melt-blown fibers as they issue from the die orifices, as the fibers are formed, with electrically charged particles such as electrons or ions. Other methods include, for example, charging the fibers after the web is formed, by means of a corona discharge or imparting a charge to the fiber mat by means of carding and/or needle tacking (tribocharging). In addition, a method in which jets of water or a stream of water droplets impinge on a non-woven web at a pressure sufficient to provide filtration enhancing electret charge has also been described (hydro-charging).

A number of materials have been added to polymeric compositions to modify the properties of the polymeric composition. For example, in U.S. Pat. No. 5,914,186 (Yau et al.), heat-resistant anti-static pressure sensitive adhesive tapes are described that comprise a substrate having coated on it a microparticle adhesive having a diameter of at least 1 micrometer. The microparticles have a conductive coating formed from a polymer electrolyte base polymer, at least one ionic salt of an alkali or alkaline earth metal, and at least one thermal stabilizer selected from the group consisting of hindered amines, salts of substituted toluimidazoles, and mixtures thereof.

Examples of electrets that have additives added include electrets with antibacterial additives as described in Japanese Patent Publication JP 08284063 which describes N-n-butylcarbamic acid 3-9 iodo-2-propynyl ester containing either an amidine or guanidine group, and 2-(4-thiazolyl)benzimidazole, and PCT Publication WO 93/14510 which describes hindered amine compounds, nitrogenous hindered phenol compounds, metallic salt hindered phenol compounds, phenol compounds, sulfur compounds, and phosphorous compounds. Japanese Patent Publication JP 06254319 describes the use of metal salts of long chain organic acids in polyolefin electrets to lessen the attenuation of the electrification quantity. European Patent Publication No. EP 623,941 describes the use of Charge Control Agents from various chemical classes in polymer electrets. U.S. Pat. No. 5,871,845 (Dahringer et al.) describes electret fibers composed of a fiber-forming polymer or polycondensate and organic or organometallic charge control compounds as contained in toners for electrophotographic processes.

Also described are processes for producing high stability electrets, such as European Patent Publication No. EP 447,166 which describes a process for producing electrets comprising alternating at least two cycles of applying electric charge and subsequently heating, and also describes electrets containing polar high-molecular weight compounds, and U.S. Pat. No. 4,874,659 (Ando et al.) which describes a process comprising placing a fiber sheet between a non-contact voltage-applied electrode and an earth electrode and supplying electricity between the electrodes.

SUMMARY

Described herein are electret webs and electret filter media. The electret webs may be a non-woven fibrous web or a film. The electret webs comprise a thermoplastic resin and a charge-enhancing additive comprising a fused aromatic urea or thiourea. The electret webs are suitable for use as filter media.

DETAILED DESCRIPTION

The need remains for electret webs with improved properties. Presented in this disclosure are electret webs containing charge-enhancing additives. These charge-enhancing additives provide electret webs that are easy to charge by a variety of different charging mechanisms such as tribocharging, corona discharge, hydrocharging or a combination thereof. In some embodiments, the electret webs of this disclosure are capable of being charged by corona discharge alone, particularly DC corona discharge, without the need for additional charging mechanisms.

Electret webs useful in the present disclosure include a blend of a thermoplastic resin and a charge-enhancing additive. Webs prepared from such blends can show enhanced properties over webs prepared with the thermoplastic resins alone. Useful charge-enhancing additives include a fused aromatic urea or thiourea. Additionally, a synergistic effect has been observed, particularly with fused aromatic urea charge-enhancing additives when used in combination with certain hindered amine light stabilizer compounds (HALS). By synergistic effect, it is meant that the effect of combination of charge-enhancing additives is greater than the effect of each charge-enhancing additive used separately.

The electret webs may be in a variety of forms. For example the web may be a continuous or discontinuous film, or a fibrous web. Fibrous webs are particularly useful for the formation of filtration medium. In some embodiments the web is a non-woven microfibrous web. Typically microfibers are 1-100 micrometers, or more typically 2-30 micrometers in effective diameter (or average diameter if measured by a method such as scanning electron microscopy) and the microfibers need not have a circular cross-section.

The terms "a", "an", and "the" are used interchangeably with "at least one" to mean one or more of the elements being described.

The term "electret" refers to a material that exhibits a quasi-permanent electric charge. The electric charge may be characterized by a variety of techniques such as the X-ray Discharge Test described in greater detail below.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl (t-butyl), n-pentyl, n-hexyl, cyclohexyl, n-heptyl, n-octyl, and ethylhexyl.

The term "heteroalkyl" refers to an alkyl group which contains heteroatoms. These heteroatoms may be pendant atoms, for example, halogens such as fluorine, chlorine, bromine, or iodine or catenary atoms such as nitrogen, oxygen or sulfur. An example of a heteroalkyl group is a polyoxyalkyl group such as $-CH_2CH_2(OCH_2CH_2)_nOCH_2CH_3$.

The term "alkoxy" refers to a group of the type $-OR$, where R is an alkyl, substituted alkyl, aryl, or aralkyl group.

The term "substituted alkyl" refers to an alkyl group which contains substituents along the hydrocarbon backbone. These substituents may be alkyl groups, heteroalkyl groups or aryl groups. An example of a substituted alkyl group is a benzyl group.

The term "aryl" refers to an aromatic carbocyclic group that is a radical containing 1 to 5 rings which may be connected or fused. The aryl group may be substituted with alkyl or heteroalkyl groups. Examples of aryl groups include phenyl groups, naphthalene groups and anthracene groups. By "fused aromatic" ring it is meant a ring system comprising at least one aromatic ring joined by more than a single chemical bond to one or more other rings. In the present disclosure, the fused aromatic rings comprise at least one aromatic ring and one hetrocyclic ring.

The term "heterocyclic ring" refers to a carbocyclic ring which contains at least one heteroatom in or attached to the ring system.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The terms "room temperature" and "ambient temperature" are used interchangeably to mean temperatures in the range of 20° C. to 25° C.

The term "hot melt processable" as used herein, refers to a composition that can transform, for example, by heat and pressure from a solid to a viscous fluid. The composition should be capable of being hot melt processed without being substantially chemically transformed, degraded or rendered unusable for the intended application.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

Thermoplastic resins useful in the present disclosure include any thermoplastic nonconductive polymer capable of retaining a high quantity of trapped electrostatic charge when formed into a web and charged. Typically, such resins have a DC (direct current) resistivity of greater than $10^{14}$ ohm-cm at the temperature of intended use. Polymers capable of acquiring a trapped charge include polyolefins such as polypropylene, polyethylene, and poly-4-methyl-1-pentene; polyvinyl chloride; polystyrene; polycarbonates; polyesters, including polylactides; and perfluorinated polymers and copolymers. Particularly useful materials include polypropylene, poly-4-methyl-1-pentene, blends thereof or copolymers formed from at least one of propylene and 4-methyl-1-pentene.

Examples of suitable thermoplastic resins include, for example, the polypropylene resins: ESCORENE PP 3746G commercially available from Exxon-Mobil Corporation, Irving, Tex.; TOTAL PP3960, TOTAL PP3860, and TOTAL PP3868 commercially available from Total Petrochemicals USA Inc., Houston, Tex.; and METOCENE MF 650 W commercially available from LyondellBasell Industries, Inc., Rotterdam, Netherlands; and the poly-4-methyl-1-pentene resin TPX-MX002 commercially available from Mitsui Chemicals, Inc., Tokyo, Japan.

The charge-enhancing additives are fused aromatic ureas or thioureas. These compounds are described by the general structure of Formula 1 shown below:

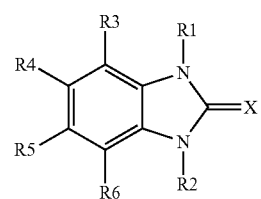

Formula 1 wherein when X=O it is a urea, and when X=S it is a thiourea, and the groups R1 and R2 comprise independently hydrogen atoms, or alkyl groups; the groups R3, R4, R5, and R6 independently comprise a hydrogen atom, an alkyl, an aryl, a heteroalkyl, a substituted alkyl, substituted aryl, or alkoxy.

Typically, fused aromatic thiourea change-enhancing additives comprise ones in which the three of the groups R3, R4, R5, and R6 comprise hydrogen atoms and one of the groups R3, R4, R5, and R6 comprises an alkyl group. In some embodiments the alkyl group comprises a methyl group.

Typically, fused aromatic urea change-enhancing additives comprise ones in which the three of the groups R3, R4, R5, and R6 comprise hydrogen atoms and one of the groups R3, R4, R5, and R6 comprises an alkyl group. In some embodiments the alkyl group comprises a methyl group.

Examples of particularly suitable charge-enhancing additives include the thiourea MTI described by Formula 2 below, and the urea described by Formula 3 below.

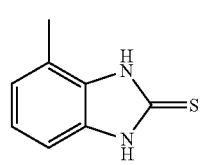

Formula 2

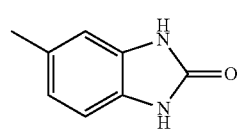

Formula 3

In some embodiments, a combination of a fused aromatic urea or thiourea charge-enhancement agent with a hindered amine light stabilizer (HALS) compound can give greater charge-enhancement than the fused aromatic urea or thiourea charge-enhancement agent by itself. HALS are a well known class of amine compounds surrounded by a crowded steric environment. They are derivatives of 2,2,6,6-tetramethyl piperidine and are extremely efficient stabilizers against light-induced degradation of most polymers. Among particularly suitable HALS compounds is "CHIMASSORB 944" (poly[[6-(1,1,3,3,-tetramethylbutyl) amino]-s-triazine-2,4-diyl][[(2,2,6,6-tetramethyl-4-piperidyl) imino] hexamethylene [(2,2,6,6-tetramethyl-4-piperidyl) imino]]), available from BASF, Ludwigshafen, Germany.

The charge-enhancing additive or combination of additives can be added in any suitable amount. The charge-enhancing additives of this disclosure have been shown to be effective even in relatively small quantities. Typically the charge-enhancing additive or combination of additives is present in a thermoplastic resin and charge-enhancing additive or additives blend in amounts of up to about 10% by weight, more typically in the range of 0.02 to 5% by weight based upon the total weight of the blend. In some embodiments, the charge-enhancing additive or combination of additives is present in an amount ranging from 0.1 to 3% by weight, 0.1 to 2% by weight, 0.2 to 1.0% by weight, or 0.25 to 0.5% by weight.

The blend of the thermoplastic resin and the charge-enhancing additive or combination of additives can be prepared by well-known methods. Typically, the blend is processed using melt extrusion techniques, so the blend may be preblended to form pellets in a batch process, or the thermoplastic resin and the charge-enhancing additive or additives may be mixed in the extruder in a continuous process. Where a continuous process is used, the thermoplastic resin and the charge-enhancing additive or additives may be pre-mixed as solids or added separately to the extruder and allowed to mix in the molten state.

Examples of melt mixers that may be used to form preblended pellets include those that provide dispersive mixing, distributive mixing, or a combination of dispersive and distributive mixing. Examples of batch methods include those using a BRABENDER (e. g. a BRABENDER PREP CENTER, commercially available from C. W. Brabender Instruments, Inc.; South Hackensack, N.J.) or BANBURY internal mixing and roll milling equipment (e.g. equipment available from Farrel Co.; Ansonia, Conn.). After batch mixing, the mixture created may be immediately quenched and stored below the melting temperature of the mixture for later processing.

Examples of continuous methods include single screw extruding, twin screw extruding, disk extruding, reciprocating single screw extruding, and pin barrel single screw extruding. The continuous methods can include utilizing both distributive elements, such as cavity transfer mixers (e.g. CTM, commercially available from RAPRA Technology, Ltd.; Shrewsbury, England) and pin mixing elements, static mixing elements or dispersive mixing elements (commercially available from e.g., MADDOCK mixing elements or SAXTON mixing elements).

Examples of extruders that may be used to extrude preblended pellets prepared by a batch process include the same types of equipment described above for continuous processing. Useful extrusion conditions are generally those which are suitable for extruding the resin without the additive.

The extruded blend of thermoplastic resin and charge-enhancing additive or additives may be cast or coated into films or sheets or may be formed into a fibrous web using any suitable techniques. Films can be made into a variety of articles including filtration media by the methods described in, for example, U.S. Pat. No. 6,524,488 (Insley et al.). Fibrous webs can be made from a variety of fiber types including, for example, melt-blown microfibers, staple fibers, fibrillated films, and combinations thereof. Techniques for preparing fibrous webs include, for example, air laid processes, wet laid processes, hydro-entanglement, spunbond processes, melt-blown processes, and combinations thereof. Melt-blown and spunbond, non-woven microfibrous webs are particularly useful as filtration media.

Melt-blown and spunbond, non-woven microfibrous electret filters are especially useful as an air filter element of a respirator, such as a filtering facepiece, or for such purposes as home and industrial air-conditioners, air cleaners, vacuum cleaners, medical air line filters, and air conditioning systems for vehicles and common equipment, such as computers, computer disk drives and electronic equipment. In some embodiments, the electret filters are combined with a respirator assembly to form a respiratory device designed to be used by a person. In respirator uses, the electret filters may be in the form of molded, pleated, or folded half-face respirators, replaceable cartridges or canisters, or prefilters.

Melt-blown microfibers useful in the present disclosure can be prepared as described in Van A. Wente, "Superfine Thermoplastic Fibers," Industrial Engineering Chemistry, vol. 48, pp. 1342-1346 and in Report No. 4364 of the Naval Research Laboratories, published May 25, 1954, entitled "Manufacture of Super Fine Organic Fibers" by Van A. Wente et al.

Spunbond microfibers may be formed using a spunbond process in which one or more continuous polymeric free-fibers are extruded onto a collector, as described, for example, in U.S. Pat. Nos. 4,340,563 and 8,162,153 and US Patent Publication No. 2008/0038976.

Useful melt-blown and spunbond microfibers for fibrous electret filters typically have an effective fiber diameter of from about 1-100 micrometers, more typically 2 to 30 micrometers, in some embodiments from about 7 to 15 micrometers, as calculated according to the method set forth in Davies, C. N., "The Separation of Airborne Dust and Particles," Institution of Mechanical Engineers, London, Proceedings 1B, 1952.

Staple fibers may also be present in the web. The presence of staple fibers generally provides a more lofty, less dense web than a web of only blown microfibers. Generally, no more than about 90 weight percent staple fibers are present, more typically no more than about 70 weight percent. Examples of webs containing staple fiber are disclosed in U.S. Pat. No. 4,118,531 (Hauser).

Sorbent particulate material such as activated carbon or alumina may also be included in the web. Such particles may be present in amounts up to about 80 volume percent of the contents of the web. Examples of particle-loaded webs are described, for example, in U.S. Pat. No. 3,971,373 (Braun), U.S. Pat. No. 4,100,324 (Anderson) and U.S. Pat. No. 4,429,001 (Kolpin et al.).

Various optional additives can be blended with the thermoplastic composition including, for example, pigments, light stabilizers, primary and secondary antioxidants, metal deactivators, nucleating agents, hindered amines, hindered phenols, fatty acid metal salts, triester phosphites, phosphorous-containing compounds, sulfur-containing compounds, fluorine-containing compounds and combinations thereof.

HALS have already been mentioned as particularly suitable additives because the use of these additives can serve not only as stabilizers but also as charge-enhancing additives. In addition, antioxidants in some instances can also function as charge enhancing additives. Possible charge additives include thermally stable organic triazine compounds or oligomers, which compounds or oligomers contain at least one nitrogen atom in addition to those in the triazine ring, see, for example, U.S. Pat. Nos. 6,268,495, 5,976,208, 5,968,635, 5,919,847, and 5,908,598 to Rousseau et al. Another additive known to enhance electrets is "CHIMAS-SORB 944: (poly[[6-(1,1,3,3,-tetramethylbutyl) amino]-s-triazine-2,4-diyl][[(2,2,6,6-tetramethyl-4-piperidyl) imino] hexamethylene [(2,2,6,6-tetramethyl-4-piperidyl) imino]]), available from BASF, Ludwigshafen, Germany. The charge-enhancing additives may be N-substituted amino aromatic compounds, particularly tri-amino substituted compounds, such as 2,4,6-trianilino-p-(carbo-2'-ethylhexyl-1'-oxy)-1,3, 5-triazine commercially available as "UVINUL T-150" from BASF, Ludwigshafen, Germany. Another charge additive is 2,4,6-tris-(octadecylamino)-triazine, also known as tristearyl melamine ("TSM"). Further examples of charge-enhancing additives are provided in U.S. Patent Application Ser. No. 61/058,029, U.S. Patent Application Ser. No. 61/058,041, U.S. Pat. No. 7,390,351 (Leir et al.), U.S. Pat. No. 5,057,710 (Nishiura et al.), and U.S. Pat. Nos. 4,652,282 and 4,789,504 (Ohmori et al.).

In addition the web may be treated to chemically modify its surface. Surface fluorination can be achieved by placing a polymeric article in an atmosphere that contains a fluorine-containing species and an inert gas and then applying an electrical discharge to modify the surface chemistry of the polymeric article. The electrical discharge may be in the form of a plasma such as an AC corona discharge. This plasma fluorination process causes fluorine atoms to become present on the surface of the polymeric article. The plasma fluorination process is described in a number of U.S. Pat. Nos. 6,397,458, 6,398,847, 6,409,806, 6,432,175, 6,562, 112, 6,660,210, and 6,808,551 to Jones/Lyons et al. Electret articles that have a high fluorosaturation ratio are described in U.S. Pat. No. 7,244,291 to Spartz et al., and electret articles that have a low fluorosaturation ratio, in conjunction with heteroatoms, is described in U.S. Pat. No. 7,244,292 to Kirk et al. Other publications that disclose fluorination techniques include: U.S. Pat. Nos. 6,419,871, 6,238,466, 6,214,094, 6,213,122, 5,908,598, 4,557,945, 4,508,781, and 4,264,750; U.S. Publications US 2003/0134515 A1 and US 2002/0174869 A1; and International Publication WO 01/07144.

The electret filter media prepared according to the present disclosure generally have a basis weight (mass per unit area) in the range of about 10 to 500 g/m$^2$, and in some embodiments, about 10 to 100 g/m$^2$. In making melt-blown microfiber webs, the basis weight can be controlled, for example, by changing either the collector speed or the die throughput. The thickness of the filter medium is typically about 0.25 to 20 millimeters, and in some embodiments, about 0.5 to 2 millimeters. Multiple layers of fibrous electret webs are commonly used in filter elements. The solidity of the fibrous electret web typically is about 1% to 25%, more typically about 3% to 10%. Solidity is a unitless parameter that defines the solids fraction of the web. Generally the methods of this disclosure provide electret webs with generally uniform charge distribution throughout the web without regard to basis weight, thickness, or solidity of the medium. The electret filter medium and the resin from which it is produced should not be subjected to any unnecessary treatment which might increase its electrical conductivity, e.g., exposure to ionizing radiation, gamma rays, ultraviolet irradiation, pyrolysis, oxidation, etc.

The electret web may be charged as it is formed or the web may be charged after the web is formed. In electret filter medium, the medium is generally charged after the web is formed. In general, any standard charging method known in the art may be used. For example, charging may be carried out in a variety of ways, including tribocharging, corona discharge and hydrocharging. A combination of methods may also be used. As mentioned above, in some embodiments, the electret webs of this disclosure have the desirable feature of being capable of being charged by corona discharge alone, particularly DC corona discharge, without the need of additional charging methods.

Examples of suitable corona discharge processes are described in U.S. Pat. Re. No. 30,782 (van Turnhout), U.S. Pat. Re. No. 31,285 (van Turnhout), U.S. Pat. Re. No. 32,171 (van Turnhout), U.S. Pat. No. 4,215,682 (Davis et al.), U.S. Pat. No. 4,375,718 (Wadsworth et al.), U.S. Pat. No. 5,401,446 (Wadsworth et al.), U.S. Pat. No. 4,588,537 (Klaase et al.), U.S. Pat. No. 4,592,815 (Nakao), and U.S. Pat. No. 6,365,088 (Knight et al.).

Another technique that can be used to charge the electret web is hydrocharging. Hydrocharging of the web is carried out by contacting the fibers with water in a manner sufficient to impart a charge to the fibers, followed by drying of the web. One example of hydrocharging involves impinging jets of water or a stream of water droplets onto the web at a pressure sufficient to provide the web with filtration enhancing electret charge, and then drying the web. The pressure necessary to achieve optimum results varies depending on the type of sprayer used, the type of polymer from which the web is formed, the type and concentration of additives to the polymer, the thickness and density of the web and whether pre-treatment, such as corona surface treatment, was carried out prior to hydrocharging. Generally, water pressures in the range of about 10 to 500 psi (69 to 3450 kPa) are suitable. The jets of water or stream of water droplets can be provided by any suitable spray device. One example of a useful spray device is the apparatus used for hydraulically entangling fibers. An example of a suitable method of hydrocharging is described in U.S. Pat. No. 5,496,507 (Angadjivand et al.). Other methods of hydrocharging are described in U.S. Pat. No. 6,824,718 (Eitzman et al.), U.S. Pat. No. 6,743,464 (Insley et al.), U.S. Pat. No. 6,454,986 (Eitzman et al.), U.S. Pat. No. 6,406,657 (Eitzman et al.), and U.S. Pat. No. 6,375,886 (Angadjivand et al.). The hydrocharging of the web may also be carried out using the method disclosed in the U.S. Pat. No. 7,765,698 (Sebastian et al.).

To assess filtration performance, a variety of filtration testing protocols has been developed. These tests include measurement of the aerosol penetration of the filter web using a standard challenge aerosol such as dioctylphthalate (DOP), which is usually presented as percent of aerosol penetration through the filter web (% Pen) and measurement of the pressure drop across the filter web ($\Delta P$). From these two measurements, a quantity known as the Quality Factor (QF) may be calculated by the following equation:

$$QF = -\ln(\% Pen/100)/\Delta P,$$

where ln stands for the natural logarithm. A higher QF value indicates better filtration performance, and decreased QF values effectively correlate with decreased filtration performance. Details for measuring these values are presented in the Examples section. Typically, the filtration medium of this disclosure have measured QF values of 0.3 (mm of $H_2O)^{-1}$ or greater at a face velocity of 6.9 centimeters per second.

To verify that a particular filter medium is electrostatically charged in nature, one may examine its performance before and after exposure to ionizing X-ray radiation. As described in the literature, for example, *Air Filtration* by R. C. Brown (Pergamon Press, 1993) and "Application of Cavity Theory to the Discharge of Electrostatic Dust Filters by X-Rays", A. J. WAKER and R. C. BROWN, *Applied Radiation and Isotopes*, Vol. 39, No. 7, pp. 677-684, 1988, if an electrostatically charged filter is exposed to X-rays, the penetration of an aerosol through the filter will be greater after exposure than before exposure, because the ions produced by the X-rays in the gas cavities between the fibers will have neutralized some of the electric charge. Thus, a plot of penetration against cumulative X-ray exposure can be obtained which shows a steady increase up to a constant level after which further irradiation causes no change. At this point all of the charge has been removed from the filter.

These observations have led to the adoption of another testing protocol to characterize filtration performance, the X-ray Discharge Test. In this testing protocol, select pieces of the filter medium to be tested are subjected to X-ray radiation to discharge the electret web. One attribute of this test is that it confirms that the web is an electret. Because it is known that X-rays quench electret charge, exposure of a filter medium to X-rays and measuring the filter performance before and after this exposure and comparing the filter performances indicates whether the filter medium is an electret. If the filter performance is unchanged after exposure to X-ray radiation, that is indicative that no charge was quenched and the material is not an electret. However, if the filter performance diminishes after exposure to X-ray radiation, that is indicative that the filter medium is an electret.

When the test is run, typically, the filtration performance is measured before and after exposure of the filter medium to the X-ray radiation. A % Penetration Ratio can be calculated according to the following equation: % Penetration Ratio=(ln(initial % DOP Penetration/100)/(ln(% DOP Penetration after 60 min of X-ray exposure/100)))×100, when tested according to the Filtration Performance Test Method, as described in the Examples section below. In order for the web to have sufficient charge for use as a filter, the % Penetration Ratio is typically at least 300%. As the % Penetration Ratio increases, the filtration performance of the web also increases. In some embodiments, the % Penetration Ratio is at least 400%, 500%, or 600%. In particularly desirable embodiments, the % Penetration Ratio is at least 750% or 800%. In some embodiments, the web exhibits a % Penetration Ratio of at least 1000%, or at least 1250%.

The initial Quality Factor (prior to exposure to X-rays) is typically at least 0.3 (mm of $H_2O)^{-1}$, more typically at least 0.4 or even 0.5 (mm of $H_2O)^{-1}$ for a face velocity of 6.9 cm/s when tested according to the Filtration Performance Test Method, as described in the Examples section below. In some embodiments, the initial Quality Factor is at least 0.6 or 0.7 (mm of $H_2O)^{-1}$. In other embodiments, the initial Quality Factor is at least 0.8, at least 0.90, at least 1.0, or even greater than 1.0 (mm of $H_2O)^{-1}$. The Quality Factor after 60 minutes exposure to X-rays is typically less than 50% of the initial Quality Factor. In some embodiments, the initial Quality Factor is at least 0.5 (mm of $H_2O)^{-1}$ or greater and the Quality Factor after 60 minutes exposure to X-rays is less than 0.15 (mm of $H_2O)^{-1}$.

The disclosure includes the following embodiments:

Among the embodiments are electret webs. The first embodiment includes an electret web comprising: a thermoplastic resin; and a charge-enhancing additive comprising a fused aromatic thiourea, a fused aromatic urea compound, or a combination thereof.

Embodiment 2 is the electret web of embodiment 1, wherein the web comprises a non-woven fibrous web.

Embodiment 3 is the electret web of embodiment 1, wherein the web comprises a film.

Embodiment 4 is the electret web of any of embodiments 1-3, wherein the fused aromatic thiourea compound comprises a compound with the structure (a):

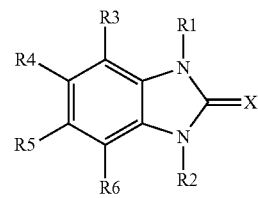

wherein X=S, the groups R1 and R2 independently comprise a hydrogen atom, or an alkyl group; the groups R3, R4, R5, and R6 independently comprise a hydrogen atom, an alkyl, an aryl, a heteroalkyl, a substituted alkyl, substituted aryl, or alkoxy.

Embodiment 5 is the electret web of embodiment 4, wherein the groups R1 and R2 comprise hydrogen atoms; three of the groups R3, R4, R5, and R6 comprise a hydrogen atoms, and one of the groups R3, R4, R5, and R6 comprises an alkyl group.

Embodiment 6 is the electret web of embodiment 5, wherein the fused aromatic thiourea compound comprises a compound with the structure (c):

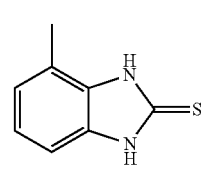

Embodiment 7 is the electret web of any of embodiments 1-3, wherein the fused aromatic urea compound comprises a compound with the structure (b):

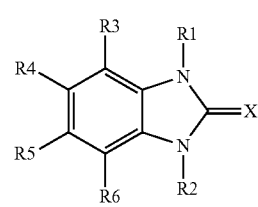

wherein X=O, the groups R1 and R2 independently comprise a hydrogen atom, or an alkyl group; the groups R3, R4, R5, and R6 independently comprise a hydrogen atom, an alkyl, an aryl, a heteroalkyl, a substituted alkyl, substituted aryl, or alkoxy.

Embodiment 8 is the electret web of embodiment 7, wherein the groups R1 and R2 comprise hydrogen atoms; three of the groups R3, R4, R5, and R6 comprise a hydrogen atoms, and one of the groups R3, R4, R5, and R6 comprises an alkyl group.

Embodiment 9 is the electret web of embodiment 8, wherein the fused aromatic urea compound comprises a compound with the structure (d):

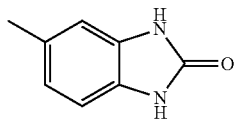

(d)

Embodiment 10 is the electret web of any of embodiments 1-9, wherein the charge-enhancing additive further comprises at least one hindered amine light stabilizer compound.

Embodiment 11 is the electret web of any of embodiments 1-10, wherein the thermoplastic resin comprises: polyolefin; polyvinyl chloride; polystyrene; polycarbonate; or polyester.

Embodiment 12 is the electret web of any of embodiments 1-11, wherein the charge-enhancing additive or additives comprise 0.02-5.0% by weight of the web.

Embodiment 13 is the electret web of any of embodiments 1-12, wherein the web contains an electrostatic charge, wherein the charge is imparted through corona treatment, hydrocharging, or a combination thereof.

Embodiment 14 is the electret web of any of embodiments 1-13, wherein the web further comprises at least one additional additive selected from pigments, light stabilizers, primary and secondary antioxidants, metal deactivators, nucleating agents, hindered amines, hindered phenols, fatty acid metal salts, triester phosphites, phosphorous-containing compounds, sulfur-containing compounds, fluorine-containing compounds and combinations thereof.

Also disclosed are electret filter media. Embodiment 15 is an electret filter medium comprising: a web comprising: a thermoplastic resin; and a charge-enhancing additive comprising a fused aromatic thiourea, a fused aromatic urea compound, or a combination thereof.

Embodiment 16 is the electret filter medium of embodiment 15, wherein the fused aromatic thiourea compound comprises a compound with the structure (a):

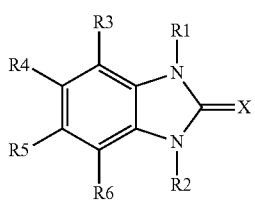

(a)

wherein X=S, the groups R1 and R2 independently comprise a hydrogen atom, or an alkyl group; the groups R3, R4, R5, and R6 independently comprise a hydrogen atom, an alkyl, an aryl, a heteroalkyl, a substituted alkyl, substituted aryl, or alkoxy.

Embodiment 17 is the electret filter medium of embodiment 16, wherein the groups R1 and R2 comprise hydrogen atoms; three of the groups R3, R4, R5, and R6 comprise a hydrogen atoms, and one of the groups R3, R4, R5, and R6 comprises an alkyl group.

Embodiment 18 is the electret filter medium of embodiment 17, wherein the fused aromatic thiourea compound comprises a compound with the structure (c):

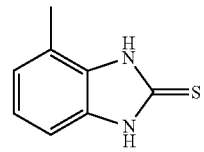

(c)

Embodiment 19 is the electret filter medium of embodiment 15, wherein the fused aromatic urea compound comprises a compound with the structure (b):

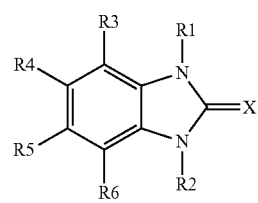

(b)

wherein X=O, the groups R1 and R2 independently comprise a hydrogen atom, or an alkyl group; the groups R3, R4, R5, and R6 independently comprise a hydrogen atom, an alkyl, an aryl, a heteroalkyl, a substituted alkyl, substituted aryl, or alkoxy.

Embodiment 20 is the electret filter medium of embodiment 19, wherein the groups R1 and R2 comprise hydrogen atoms; three of the groups R3, R4, R5, and R6 comprise a hydrogen atoms, and one of the groups R3, R4, R5, and R6 comprises an alkyl group.

Embodiment 21 is the electret filter medium of embodiment 20, wherein the fused aromatic urea compound comprises a compound with the structure (d):

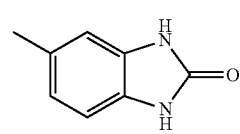

(d)

Embodiment 22 is the electret filter medium of any of embodiments 15-21, wherein the charge-enhancing additive further comprises at least one hindered amine light stabilizer compound.

Embodiment 23 is the electret filter medium of any of embodiments 15-22, wherein the thermoplastic resin comprises: polyolefin; polyvinyl chloride; polystyrene; polycarbonate; or polyester.

Embodiment 24 is the electret filter medium of any of embodiments 15-23, wherein the charge-enhancing additive or additives comprise 0.02-5.0% by weight of the web.

Embodiment 25 is the electret filter medium of any of embodiments 15-24, wherein the web contains an electrostatic charge, wherein the charge is imparted through corona treatment, hydrocharging, or a combination thereof.

Embodiment 26 is the electret web of any of embodiments 15-25, wherein the web further comprises at least one additional additive selected from pigments, light stabilizers, primary and secondary antioxidants, metal deactivators, nucleating agents, hindered amines, hindered phenols, fatty acid metal salts, triester phosphites, phosphorous-containing compounds, sulfur-containing compounds, fluorine-containing compounds and combinations thereof.

Embodiment 27 is the electret web of any of embodiments 15-26, wherein the filter medium has a % Penetration Ratio of at least 300% at a face velocity of 6.9 centimeters per second when tested according to the X-ray Discharge Test.

Embodiment 28 is the electret web of any of embodiments 15-27, wherein the filter medium has an Initial Quality Factor of at least 0.3 (mm of $H_2O)^{-1}$ at a face velocity of 6.9 centimeters per second, and after exposure to X-rays for 60 minutes, a Quality Factor of less than 50% of the Initial Quality Factor, when tested according to the X-ray Discharge Test.

Embodiment 29 is the electret web of any of embodiments 15-28, wherein the filter medium retains at least 85% filtration performance as measured by Quality Factor after aging for 72 hours at 71° C.

EXAMPLES

These examples are merely for illustrative purposes only and are not meant to be limiting on the scope of the appended claims. All parts, percentages, ratios, etc. in the examples and the rest of the specification are by weight, unless noted otherwise. As used herein: mL=milliliters; mol=moles; DI=de-ionized; N=Normal; L=liters; kg=kilogram, g=gram, cm=centimeters; in =inches; hr=hour; $m^2$=meters squared; lb=pounds; mm=millimeters; kPa=kilopascals; Pa=Pascals; mg=milligrams; s=seconds; $m^3$=cubic meters.

| Table of Abbreviations | |
|---|---|
| Abbreviation or Trade Designation | Description |
| Charge Additive-1; CA-1 | MTI, 2 mercaptotoluimidazole, CAS 64588-63-2, commercially available from R T Vanderbilt, Norwalk, CT. |
| Charge Additive-2; CA-2 | See synthesis example S1 |
| Charge Additive-3; CA-3 | The Hindered Amine Light Stabilizer CAS 71878-19-8, commercially available as "CHIMASSORB 944" from BASF, |
| PP-1 | Polypropylene, PP-650W, commercially available from LyondellBasell Industries, Houston, TX. |
| PP-2 | Polypropylene, Total 3865, commercially available from Total Petrochemicals USA Inc., Houston, TX. |
| PP-3 | Polypropylene, Achieve 1605, commercially available from ExxonMobil Chemical Company., Houston, TX, USA |
| PP-4 | Polypropylene, Total 3860, commercially available from Total Petrochemicals USA Inc., Houston, TX. |

Additive Examples

The charging additives that we have studied are MTI (Charging Additive-1) shown as Formula 2 below and Charging Additive-2, shown as Formula 3 below. MTI is commercially available from RT Vanderbilt and Charging Additive-2 was synthesized as described below in Synthesis Example S1. Charging Additive-3 is commercially available from BASF as "CHIMASSORB 944", a hindered amine light stabilizer (HALS).

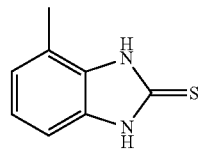

Formula 2

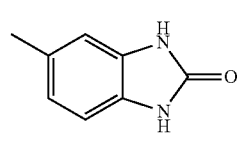

Formula 3

Synthesis Example S1: Synthesis of Charging Additive-2

Charging Additive-2 was synthesized by condensing urea with 3,4-diaminotoluene according to Scheme 1.

Scheme 1

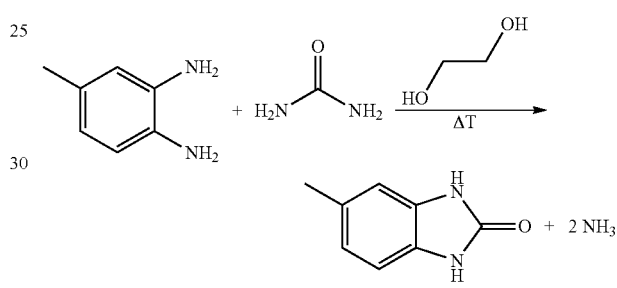

A sample of 150 grams of 1,3-diaminotoluene (1.23 mol), 74 grams of urea (1.23 mol), and 400 mL of ethylene glycol was refluxed at 150° C. under nitrogen for 8 hours. The mixture was allowed to cool and poured into 2000 mL of DI water and allowed to stand overnight. The precipitate was vacuum filtered and sequentially washed with 1 L of 0.1 N HCl, 1 L of DI water, and 1 L of 90/10 DI water/methanol. The yield was 60%. Proton NMRs of the diamino starting material and products were consistent with the structure of Formula 3.

Examples 1-44 and Comparative Examples C1-C15

For each of the Examples and Comparative Examples, the procedures described below were followed. The data for these Examples are presented in Tables 2-3.

Non-Woven Sample Preparation

Step A—Preparation of Microfiber Non-Woven Webs (Melt-Blown):

For each Example, one of the Charging Additives described above was selected and dry blended with one of the four grades of polypropylene at the concentration shown in Table 1, and the blend was extruded as described in Van A. Wente, "Superfine Thermoplastic Fibers," Industrial Engineering Chemistry, vol. 48, pp. 1342-1346. The extrusion temperature ranged from about 250° C.-300° C. and the extruder was a BRABENDER conical twin-screw extruder (commercially available from Brabender Instruments, Inc.) operating at a rate of about 2.5 to 3 kg/hr (5-7 lb/hr). The die was 25.4 cm (10 in) wide with 10 holes per centimeter (25 holes per inch). Melt-blown webs were formed having basis weights of about 50-60 g/m², effective fiber diameters of about 6.5-9.5 micrometers and a thicknesses of about 0.75-2 millimeters.

Step B—Preparation of Microfiber Non-Woven Webs (Spun-Bond):

A mono-component monolayer nonwoven web was produced from different PP resins with melt additives using the process described in U.S. Patent Publication No. 2008/0038976. The extrusion head had orifices of 0.35 mm diameter with a 4:1 L/D (length to diameter) ratio which were configured in a pattern having a linear density of approximately 900 orifices per meter. The orifices were spaced forming adjoining isosceles triangles with a base aligned 90 degrees to the direction of travel of the collector belt of 14 mm and a height of 9.5 mm, the holes being at the vertices. There were 13 rows of holes. The flow rate of molten PP polymer was approximately 1.99 grams per orifice per minute, with an extrusion temperature of around 210 to 260° C.

Two opposed quenching air streams were supplied from quench boxes 41 cm in height with an approximate face velocity of 0.8 m/sec and a temperature slightly chilled from ambient. A movable-wall attenuator similar to that shown in U.S. Pat. Nos. 6,607,624 and 6,916,752 was employed, using an air knife gap of 0.51 mm, air fed to the air knife at a pressure of 117 kPa, an attenuator top gap width of 7.1 mm, an attenuator bottom gap width of 7.1 mm, and an attenuation chamber length of 15 cm. The distance from the extrusion head to the attenuator was approximately 61 cm, and the distance from the bottom of the attenuator to the collection belt was approximately 66 cm. The melt-spun filament stream was deposited on the collection belt at a width of about 53 cm with a vacuum established under the collection belt of approximately 650 Pa. The collection belt was a 9 SS TC model from Albany International Corp. (Rochester, N.H.) and moved at a certain velocity ("forming speed").

The mass (web) of collected melt-spun nonwoven filaments was then passed underneath a controlled-heating bonding device to autogeneously bond some of the filaments together. Air was supplied through the bonding device which had an outlet slot 7.6 cm by 71 cm. The air outlet was about 2.5 cm from the collected web as the web passed underneath the bonding device. The temperature and velocity of the air passing through the slot were controlled by the heating device. The temperature was measured at the entry point for the heated air into the housing of the bonding device. Ambient temperature air was forcibly drawn through the web after the web passed underneath the bonding device, to cool the web to approximately ambient temperature.

The resulting nonwoven web was bonded with sufficient integrity to be self-supporting and handleable using standard processes and equipment, such as wound onto a storage roll or subjected to various operations such as assembly into a filtration device. Webs were collected at a certain basis weight produced by varying the speed of the collection belt. Several different webs were produced, as described in Table 1.

Step C—Electret Preparation:

Each of the melt-blown webs prepared in Step A (Examples 1-23 and Comparative Examples C1-C6) or each of spun-bond webs prepared in Step B as above (Examples 24-44 and Comparative Examples C7-C15) was charged by one of three electret charging methods: hydrocharging, corona charging, or corona pre-treatment and hydrocharging. Table 1 summarizes the specific charging method applied to each of the samples.

Charging Method 1—Corona Charging:

The selected melt-blown webs prepared above were charged by DC corona discharge. The corona charging was accomplished by passing the web on a grounded surface under a corona brush source with a corona current of about 0.01 milliamp per centimeter of discharge source length at a rate of about 3 centimeters per second. The corona source was about 3.5 centimeters above the grounded surface on which the web was carried. The corona source was driven by a positive DC voltage.

Charging Method 2—Hydrocharging:

A fine spray of high purity water having a conductivity of less than 5 microS/cm was continuously generated from a nozzle operating at a pressure of 896 kiloPascals (130 psig) and a flow rate of approximately 1.4 liters/minute. The selected melt-blown webs prepared in Step A were conveyed by a porous belt through the water spray at a speed of approximately 10 centimeters/second while a vacuum simultaneously drew the water through the web from below. Each melt-blown web was run through the hydrocharger twice (sequentially once on each side) and then allowed to dry completely overnight prior to filter testing.

Charging Method 3—Corona Pre-Treatment and Hydrocharging:

The selected melt-blown webs prepared in Step A above were pretreated by DC corona discharge as described in Charging Method 1 and then charged by hydrocharging as described in Charging Method 2.

Likewise, for each Comparative Example, a melt-blown web was prepared from the same grade of polypropylene as the corresponding Examples web, but no charge additive was added. Table 1 summarizes the specific web characteristics for each of the examples.

Test Methods

Filtration Performance Test Method, Non-Woven Melt-Blown Microfiber Webs

The samples were tested for % DOP and/or % NaCl aerosol penetration (% Pen) and pressure drop (ΔP), and the quality factor (QF) was calculated. The filtration performance (% Pen and QF) of the nonwoven microfiber webs were evaluated using an Automated Filter Tester AFT Model 8127 (available from TSI, Inc., St. Paul, Minn.) using dioctylphthalate (DOP) or sodium chloride (NaCl) as the challenge aerosol and a MKS pressure transducer that measured pressure drop (ΔP (mm of $H_2O$)) across the filter. The DOP aerosol was nominally a monodisperse 0.33 micrometer mass median (MMD) diameter having an upstream concentration of 50-200 mg/m³ and a target of 100 mg/m³. The NaCl aerosol MMD is 0.26 with an upstream concentration of 12-20 mg/m³ and a target of 15 mg/m³. The aerosol was forced through a sample of filter media at a calibrated flow rate of either 42.5 liters/minute (face velocity of 6.9 cm/s) or 85 liters/minute (face velocity of 13.8 cm/s) with the aerosol ionizer turned off for DOP aerosols and turned on for NaCl aerosols. The total testing time was 23 seconds (rise time of 15 seconds, sample time of 4 seconds, and purge time of 4 seconds). The concentration of DOP and NaCl aerosols was measured by light scattering both upstream and downstream of the filter media using calibrated photometers. The DOP % Pen is defined as: % Pen=100×(DOP concentration downstream/DOP concentration upstream) and likewise for NaCl. For each material, 6 separate measurements were made at different locations on the melt-blown web and the results were averaged.

The % Pen and ΔP were used to calculate a QF by the following formula:

$$QF = -\ln(\%\ Pen/100)/\Delta P,$$

where ln stands for the natural logarithm. A higher QF value indicates better filtration performance and decreased QF values effectively correlate with decreased filtration performance. The quality factor of the as generated webs without exposure to other environments is typically designated as "$Q_0$," the Initial Quality Factor.

Accelerated Aging Performance

In order to determine the stability of the filtration performance, accelerated aging was tested by comparing the initial quality factor of charged melt-blown webs with its quality factor after storage at different temperatures for different periods of time.

In one test, the webs are stored for 72 hours at 71° C. in air. This quality factor after aging at this condition is typically designated as "$Q_3$". The performance retention is calculated by the following equation:

$$\%\ \text{Retention}\ (Q_3) = (Q_3\ \text{(after aging for 72 hours at 71° C.)}/Q_0\ \text{(initial)}) \times 100\%$$

TABLE 1

Melt-Blown and Spun-Bond webs

| Example | Resin | Additive | Additive Amount (% wt) | Basis Wt. (g/m²) | Solidity (%) | Eff. Fiber Diam. (μm) | Charging Method |
|---|---|---|---|---|---|---|---|
| C1 | PP-1 | None | none | 52 | 6.5 | 8.5 | 1 |
| E1 | PP-1 | CA-1 | 0.2 | 55 | 5.8 | 8 | 1 |
| E2 | PP-1 | CA-1 | 0.5 | 55 | 6 | 8.3 | 1 |
| E3 | PP-1 | CA-1 | 0.8 | 52 | 7.2 | 8.5 | 1 |
| E4 | PP-1 | CA-1/CA-3 | 0.5/1.0 | 56 | 6.4 | 8.1 | 1 |
| C2 | PP-1 | None | 0.0 | 52 | 6.5 | 8.5 | 1 |
| E5 | PP-1 | CA-1 | 0.2 | 55 | 5.8 | 8 | 1 |
| E6 | PP-1 | CA-1 | 0.5 | 55 | 6 | 8.3 | 1 |
| E7 | PP-1 | CA-1 | 0.8 | 52 | 7.2 | 8.5 | 1 |
| E8 | PP-1 | CA-1/CA-3 | 0.5/1.0 | 56 | 6.4 | 8.1 | 1 |
| C3 | PP-1 | None | 0.0 | 52 | 6.5 | 8.5 | 3 |
| E9 | PP-1 | CA-1 | 0.2 | 55 | 5.8 | 8 | 3 |
| E10 | PP-1 | CA-1 | 0.5 | 55 | 6 | 8.3 | 3 |
| E11 | PP-1 | CA-1 | 0.8 | 52 | 7.2 | 8.5 | 3 |
| E12 | PP-1 | CA-1/CA-3 | 0.5/1.0 | 56 | 6.4 | 8.1 | 3 |
| C4 | PP-1 | none | 0.0 | 56 | 6.4 | 8.1 | 1 |
| E13 | PP-1 | CA-2 | 0.2 | 54 | 6.2 | 8 | 1 |
| E14 | PP-1 | CA-2 | 0.5 | 52 | 5.9 | 7.8 | 1 |
| E15 | PP-1 | CA-2 | 1.0 | 55 | 7 | 9.6 | 1 |
| E16 | PP-1 | CA-2/CA-3 | 0.2/1.0 | 51 | 7.1 | 9.3 | 1 |
| C5 | PP-1 | None | 0.0 | 56 | 6.4 | 8.1 | 1 |
| E17 | PP-1 | CA-2 | 0.2 | 54 | 6.2 | 8 | 1 |
| E18 | PP-1 | CA-2 | 0.5 | 52 | 5.9 | 7.8 | 1 |
| E19 | PP-1 | CA-2 | 1.0 | 55 | 7 | 9.6 | 1 |
| E20 | PP-1 | CA-2/CA-3 | 0.2/1.0 | 51 | 7.1 | 9.3 | 1 |
| C6 | PP-1 | None | 0.0 | 58 | 5.8 | 7.6 | 2 |
| E21 | PP-1 | CA-2 | 0.2 | 54 | 6.2 | 8 | 2 |
| E22 | PP-1 | CA-2 | 0.5 | 52 | 5.9 | 7.8 | 2 |
| E23 | PP-1 | CA-2 | 1.0 | 55 | 7 | 9.6 | 2 |
| C7 | PP-2 | None | 0 | 63.7 | 10.8 | 16.9 | 1 |
| E24 | PP-2 | CA-2 | 0.2 | 64.4 | 10.1 | 16.8 | 1 |
| E25 | PP-2 | CA-2 | 0.5 | 64.4 | 10.7 | 16.9 | 1 |
| C8 | PP-2 | None | 0 | 63.7 | 10.8 | 16.9 | 2 |
| E26 | PP-2 | CA-2 | 0.2 | 64.4 | 10.1 | 16.8 | 2 |
| E27 | PP-2 | CA-2 | 0.5 | 64.4 | 10.7 | 16.9 | 2 |
| C9 | PP-2 | None | 0 | 63.7 | 10.8 | 16.9 | 3 |
| E28 | PP-2 | CA-2 | 0.2 | 64.4 | 10.1 | 16.8 | 3 |
| E29 | PP-2 | CA-2 | 0.5 | 64.4 | 10.7 | 16.9 | 3 |
| C10 | PP-3 | None | 0 | 63.7 | 13.1 | 19.4 | 1 |
| E30 | PP-3 | CA-2 | 0.2 | 65.2 | 9.7 | 16.8 | 1 |
| E31 | PP-3 | CA-3 | 0.8 | 63.7 | 13.8 | 18.1 | 1 |
| E32 | PP-3 | CA-2/CA-3 | 0.2/0.8 | 65.9 | 14.2 | 21.1 | 1 |
| C11 | PP-3 | None | 0 | 63.7 | 13.1 | 19.4 | 2 |
| E33 | PP-3 | CA-2 | 0.2 | 65.2 | 9.7 | 16.8 | 2 |
| E34 | PP-3 | CA-3 | 0.8 | 63.7 | 13.8 | 18.1 | 2 |
| E35 | PP-3 | CA-2/CA-3 | 0.2/0.8 | 65.9 | 14.2 | 21.1 | 2 |
| C12 | PP-3 | None | 0 | 63.7 | 13.1 | 19.4 | 3 |
| E36 | PP-3 | CA-2 | 0.2 | 65.2 | 9.7 | 16.8 | 3 |
| E37 | PP-3 | CA-3 | 0.8 | 63.7 | 13.8 | 18.1 | 3 |
| E38 | PP-3 | CA-2/CA-3 | 0.2/0.8 | 65.9 | 14.2 | 21.1 | 3 |
| C13 | PP-4 | None | 0 | 65.2 | 12.3 | 17.8 | 1 |
| E39 | PP-4 | CA-3 | 0.8 | 65.2 | 12.3 | 17.5 | 1 |
| E40 | PP-4 | CA-1/CA-3 | 0.2/0.8 | 65.9 | 12.7 | 17.6 | 1 |
| C14 | PP-4 | None | 0 | 65.2 | 12.3 | 17.8 | 2 |
| E41 | PP-4 | CA-3 | 0.8 | 65.2 | 12.3 | 17.5 | 2 |
| E42 | PP-4 | CA-1/CA-3 | 0.2/0.8 | 65.9 | 12.7 | 17.6 | 2 |
| C15 | PP-4 | None | 0 | 65.2 | 12.3 | 17.8 | 3 |
| E43 | PP-4 | CA-3 | 0.8 | 65.2 | 12.3 | 17.5 | 3 |
| E44 | PP-4 | CA-1/CA-3 | 0.2/0.8 | 65.9 | 12.7 | 17.6 | 3 |

TABLE 2

Quality Factor Data of Melt-Blown and Spun-Bond Webs

| Example | Test Method | Flow Rate liter/minute | Initial % Pen | Initial ΔP (1/mm $H_2O$) | $Q_0$ | Aged % Pen | Aged ΔP (1/mm $H_2O$) | $Q_3$ | % Retention $Q_3/Q_0$ |
|---|---|---|---|---|---|---|---|---|---|
| C1 | DOP | 42.5 | 30.18 | 2.24 | 0.53 | 45.14 | 1.7 | 0.47 | 87 |
| E1 | DOP | 42.5 | 18.20 | 2.30 | 0.74 | 30.5 | 2.1 | 0.57 | 76 |
| E2 | DOP | 42.5 | 21.80 | 2.01 | 0.76 | 34.4 | 1.8 | 0.59 | 78 |
| E3 | DOP | 42.5 | 23.30 | 2.10 | 0.69 | 38.7 | 2 | 0.47 | 68 |
| E4 | DOP | 42.5 | 24.50 | 1.80 | 0.78 | 39.6 | 1.5 | 0.62 | 79 |
| C2 | NaCl | 42.5 | 18.90 | 2.14 | 0.78 | 32.88 | 1.72 | 0.65 | 83 |
| E5 | NaCl | 42.5 | 8.00 | 2.30 | 1.10 | 16.2 | 2 | 0.91 | 83 |
| E6 | NaCl | 42.5 | 12.70 | 1.90 | 1.09 | 19.5 | 1.8 | 0.91 | 84 |
| E7 | NaCl | 42.5 | 14.80 | 1.90 | 1.01 | 27 | 1.9 | 0.69 | 69 |
| E8 | NaCl | 42.5 | 12.00 | 1.70 | 1.25 | 27.1 | 1.5 | 0.87 | 70 |
| C3 | DOP | 42.5 | 15.38 | 2.20 | 0.85 | 21.16 | 1.86 | 0.83 | 98 |
| E9 | DOP | 42.5 | 12.50 | 2.04 | 1.02 | 16 | 1.96 | 0.93 | 92 |

TABLE 2-continued

Quality Factor Data of Melt-Blown and Spun-Bond Webs

| Example | Test Method | Flow Rate liter/minute | Initial % Pen | Initial ΔP (1/mm $H_2O$) | $Q_0$ | Aged % Pen | Aged ΔP (1/mm $H_2O$) | $Q_3$ | % Retention $Q_3/Q_0$ |
|---|---|---|---|---|---|---|---|---|---|
| E10 | DOP | 42.5 | 18.20 | 1.82 | 0.94 | 25.6 | 1.6 | 0.85 | 91 |
| E11 | DOP | 42.5 | 21.90 | 1.74 | 0.87 | 26.4 | 1.74 | 0.77 | 88 |
| E12 | DOP | 42.5 | 6.90 | 1.76 | 1.52 | 11.4 | 1.58 | 1.37 | 90 |
| C4 | DOP | 42.5 | 30.18 | 2.24 | 0.53 | 45.14 | 1.7 | 0.47 | 87 |
| E13 | DOP | 42.5 | 23.4 | 2.3 | 0.63 | 28.4 | 2 | 0.63 | 100 |
| E14 | DOP | 42.5 | 22.2 | 2.1 | 0.72 | 29 | 1.9 | 0.65 | 91 |
| E15 | DOP | 42.5 | 29.1 | 1.8 | 0.69 | 50.1 | 1.6 | 0.43 | 63 |
| E16 | DOP | 42.5 | 23.1 | 1.8 | 0.81 | 29 | 1.7 | 0.73 | 89 |
| C5 | NaCl | 42.5 | 18.9 | 2.14 | 0.78 | 32.88 | 1.72 | 0.65 | 83 |
| E17 | NaCl | 42.5 | 7 | 2.4 | 1.11 | 15 | 2.1 | 0.90 | 82 |
| E18 | NaCl | 42.5 | 9 | 2 | 1.20 | 14.9 | 1.9 | 1.00 | 83 |
| E19 | NaCl | 42.5 | 15.2 | 1.8 | 1.05 | 31.2 | 1.6 | 0.73 | 70 |
| E20 | NaCl | 42.5 | 10.7 | 1.9 | 1.18 | 16.6 | 1.8 | 1.00 | 85 |
| C6 | NaCl | 42.5 | 3.14 | 2.92 | 1.19 | 5.89 | 2.48 | 1.14 | 96 |
| E21 | NaCl | 42.5 | 5.53 | 2.26 | 1.28 | 6.73 | 1.88 | 1.44 | 112 |
| E22 | NaCl | 42.5 | 6.3 | 1.92 | 1.44 | 6.91 | 1.72 | 1.55 | 108 |
| E23 | NaCl | 42.5 | 6.51 | 1.76 | 1.55 | 7.4 | 1.58 | 1.65 | 106 |
| C7 | DOP | 85 | 40.8 | 2.98 | 0.3 | 55.45 | 2.81 | 0.21 | 70 |
| E24 | DOP | 85 | 32.7 | 2.87 | 0.39 | 39.15 | 2.7 | 0.35 | 90 |
| E25 | DOP | 85 | 31.98 | 2.91 | 0.39 | 38.62 | 2.7 | 0.35 | 90 |
| C8 | DOP | 85 | 59.8 | 3.03 | 0.17 | 65.72 | 2.73 | 0.15 | 88 |
| E26 | DOP | 85 | 18.7 | 2.77 | 0.61 | 22.03 | 2.67 | 0.57 | 93 |
| E27 | DOP | 85 | 18.62 | 2.93 | 0.57 | 25.07 | 2.57 | 0.54 | 95 |
| C9 | DOP | 85 | 28.87 | 2.82 | 0.44 | 33.35 | 2.63 | 0.42 | 95 |
| E28 | DOP | 85 | 18.68 | 2.76 | 0.61 | 20.43 | 2.58 | 0.62 | 102 |
| E29 | DOP | 85 | 21.98 | 2.75 | 0.55 | 22.88 | 2.57 | 0.57 | 104 |
| C10 | DOP | 85 | 62.82 | 1.25 | 0.37 | 70.13 | 1.2 | 0.3 | 81 |
| E30 | DOP | 85 | 33 | 2.81 | 0.39 | 41.02 | 2.53 | 0.35 | 90 |
| E31 | DOP | 85 | 57.25 | 1.45 | 0.39 | 60.35 | 1.37 | 0.37 | 95 |
| E32 | DOP | 85 | 61.55 | 1.07 | 0.45 | 69.38 | 0.9 | 0.41 | 91 |
| C11 | DOP | 85 | 88.92 | 1.23 | 0.1 | 90.42 | 1.13 | 0.09 | 90 |
| E33 | DOP | 85 | 17.52 | 2.76 | 0.63 | 20.52 | 2.48 | 0.64 | 102 |
| E34 | DOP | 85 | 38.23 | 1.38 | 0.7 | 41.72 | 1.4 | 0.62 | 89 |
| E35 | DOP | 85 | 41.83 | 0.98 | 0.89 | 48.83 | 1 | 0.72 | 81 |
| C12 | DOP | 85 | 50.13 | 1.27 | 0.54 | 55.5 | 1.2 | 0.49 | 91 |
| E36 | DOP | 85 | 24.5 | 2.57 | 0.55 | 25.1 | 2.35 | 0.59 | 107 |
| E37 | DOP | 85 | 44.55 | 1.42 | 0.57 | 49.37 | 1.4 | 0.5 | 88 |
| E38 | DOP | 85 | 48.76 | 0.98 | 0.74 | 54.58 | 0.9 | 0.67 | 91 |
| C13 | DOP | 85 | 72 | 1.55 | 0.21 | 77.97 | 1.4 | 0.18 | 84 |
| E39 | DOP | 85 | 53.15 | 1.28 | 0.49 | 64.43 | 1.22 | 0.36 | 73 |
| E40 | DOP | 85 | 63.63 | 1.17 | 0.39 | 70.7 | 1.05 | 0.33 | 85 |
| C14 | DOP | 85 | 81.08 | 1.57 | 0.13 | 84.87 | 1.28 | 0.13 | 96 |
| E41 | DOP | 85 | 36.1 | 1.35 | 0.75 | 47.82 | 1.1 | 0.67 | 89 |
| E42 | DOP | 85 | 35.12 | 1.22 | 0.86 | 46.83 | 1.08 | 0.70 | 82 |
| C15 | DOP | 85 | 55.83 | 1.55 | 0.38 | 69.92 | 1.5 | 0.24 | 63 |
| E43 | DOP | 85 | 43.17 | 1.42 | 0.59 | 54.8 | 1.3 | 0.46 | 78 |
| E44 | DOP | 85 | 41.88 | 1.4 | 0.62 | 52.45 | 1.1 | 0.59 | 94 |

What is claimed is:

1. An electret web comprising:
a thermoplastic resin; and
a charge-enhancing additive comprising a fused aromatic thiourea, a fused aromatic urea compound, or a combination thereof.

2. The electret web of claim 1, wherein the web comprises a non-woven fibrous web.

3. The electret web of claim 1, wherein the web comprises a film.

4. The electret web of claim 1, wherein the fused aromatic thiourea compound comprises a compound with the structure (a):

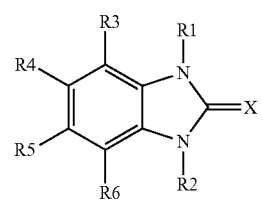
(a)

wherein X=S, the groups R1 and R2 independently comprise a hydrogen atom, or an alkyl group;

the groups R3, R4, R5, and R6 independently comprise a hydrogen atom, an alkyl, an aryl, a heteroalkyl, a substituted alkyl, substituted aryl, or alkoxy.

5. The electret web of claim 4, wherein the groups R1 and R2 comprise hydrogen atoms;
three of the groups R3, R4, R5, and R6 comprise a hydrogen atoms, and one of the groups R3, R4, R5, and R6 comprises an alkyl group.

6. The electret web of claim 1, wherein the fused aromatic urea compound comprises a compound with the structure (b):

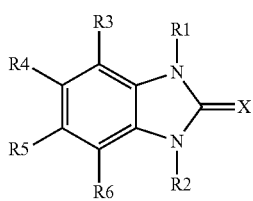

wherein X=O, the groups R1 and R2 independently comprise a hydrogen atom, or an alkyl group;
the groups R3, R4, R5, and R6 independently comprise a hydrogen atom, an alkyl, an aryl, a heteroalkyl, a substituted alkyl, substituted aryl, or alkoxy.

7. The electret web of claim 6, wherein the groups R1 and R2 comprise hydrogen atoms;
three of the groups R3, R4, R5, and R6 comprise a hydrogen atoms, and one of the groups R3, R4, R5, and R6 comprises an alkyl group.

8. The electret web of claim 1, wherein the charge-enhancing additive further comprises at least one hindered amine light stabilizer compound.

9. The electret web of claim 1, wherein the thermoplastic resin comprises:
polyolefin; polyvinyl chloride; polystyrene; polycarbonate; or polyester.

10. The electret web of claim 1, wherein the charge-enhancing additive or additives comprise 0.02-5.0% by weight of the web.

11. The electret web of claim 1, wherein the web contains an electrostatic charge, wherein the charge is imparted through corona treatment, hydrocharging, or a combination thereof.

12. The electret web of claim 1, wherein the web further comprises at least one additional additive selected from pigments, light stabilizers, primary and secondary antioxidants, metal deactivators, nucleating agents, hindered amines, hindered phenols, fatty acid metal salts, triester phosphites, phosphorous-containing compounds, sulfur-containing compounds, fluorine-containing compounds and combinations thereof.

13. An electret filter medium comprising:
a web comprising:
a thermoplastic resin; and
a charge-enhancing additive comprising a fused aromatic thiourea, a fused aromatic urea compound, or a combination thereof.

14. The electret filter medium of claim 13, wherein the fused aromatic thiourea compound comprises a compound with the structure (a):

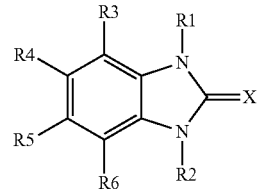

wherein X=S, the groups R1 and R2 independently comprise a hydrogen atom, or an alkyl group;
the groups R3, R4, R5, and R6 independently comprise a hydrogen atom, an alkyl, an aryl, a heteroalkyl, a substituted alkyl, substituted aryl, or alkoxy.

15. The electret filter medium of claim 14, wherein the groups R1 and R2 comprise hydrogen atoms;
three of the groups R3, R4, R5, and R6 comprise a hydrogen atoms, and one of the groups R3, R4, R5, and R6 comprises an alkyl group.

16. The electret filter medium of claim 13, wherein the fused aromatic urea compound comprises a compound with the structure (b):

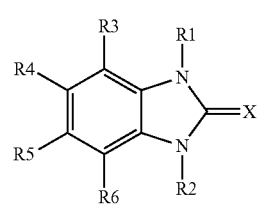

wherein X=O, the groups R1 and R2 independently comprise a hydrogen atom, or an alkyl group;
the groups R3, R4, R5, and R6 independently comprise a hydrogen atom, an alkyl, an aryl, a heteroalkyl, a substituted alkyl, substituted aryl, or alkoxy.

17. The electret filter medium of claim 16, wherein the groups R1 and R2 comprise hydrogen atoms;
three of the groups R3, R4, R5, and R6 comprise a hydrogen atoms, and one of the groups R3, R4, R5, and R6 comprises an alkyl group.

18. The electret filter medium of claim 13, wherein the charge-enhancing additive further comprises at least one hindered amine light stabilizer compound.

19. The electret filter medium of claim 13, wherein the thermoplastic resin comprises:
polyolefin; polyvinyl chloride; polystyrene; polycarbonate; or polyester.

20. The electret filter medium of claim 13, wherein the charge-enhancing additive or additives comprise 0.02-5.0% by weight of the web.

21. The electret filter medium of claim 1, wherein the web contains an electrostatic charge, wherein the charge is imparted through corona treatment, hydrocharging, or a combination thereof.

22. The electret filter medium of claim 13, wherein the web further comprises at least one additional additive selected from pigments, light stabilizers, primary and secondary antioxidants, metal deactivators, nucleating agents, hindered amines, hindered phenols, fatty acid metal salts, triester phosphites, phosphorous-containing compounds, sulfur-containing compounds, fluorine-containing compounds and combinations thereof.

* * * * *